(12) United States Patent
Hill et al.

(10) Patent No.: US 7,107,886 B2
(45) Date of Patent: Sep. 19, 2006

(54) PRODUCTION OF DISC COMPONENTS

(75) Inventors: Christopher Peter Ralph Hill, Bristol (GB); Richard Church, Bristol (GB); Benjamin Mycock, Bristol (GB)

(73) Assignee: Rolls-Royce PLC, London (GB)

(*) Notice: Subject to any disclaimer, the term of this patent is extended or adjusted under 35 U.S.C. 154(b) by 74 days.

(21) Appl. No.: 10/758,049

(22) Filed: Jan. 16, 2004

(65) Prior Publication Data
US 2004/0226420 A1 Nov. 18, 2004

(30) Foreign Application Priority Data
Feb. 4, 2003 (GB) .................... 0302553.3

(51) Int. Cl.
*B23B 1/00* (2006.01)
*B23B 3/18* (2006.01)

(52) U.S. Cl. .................... 82/1.11; 29/889.7; 29/889.23; 416/223 R

(58) Field of Classification Search .............. 82/1.11, 82/11, 18, 148, 162; 29/889.7, 889.72, 889.23, 29/558; B23B 1/00
See application file for complete search history.

(56) References Cited

U.S. PATENT DOCUMENTS

| 2,633,776 | A | * | 4/1953 | Schenk ........................ 409/132 |
| 2,856,675 | A | * | 10/1958 | Hansen ....................... 29/889.7 |
| 2,959,843 | A | * | 11/1960 | Uitvlugt .................... 29/889.7 |
| 3,566,493 | A | * | 3/1971 | Poucher et al. .......... 29/889.71 |
| 4,031,809 | A | * | 6/1977 | Shraiman et al. ............. 409/84 |
| 4,663,011 | A | * | 5/1987 | Hinman .................. 204/224 M |
| 4,747,237 | A | * | 5/1988 | Giebmanns ..................... 451/5 |
| 5,125,775 | A | * | 6/1992 | Breuer et al. ............... 409/132 |
| 5,193,314 | A | * | 3/1993 | Wormley et al. .............. 451/5 |
| 5,507,617 | A | * | 4/1996 | Sun ........................... 415/55.1 |
| 5,645,466 | A | * | 7/1997 | Wikle ............................. 451/5 |
| 5,876,183 | A | * | 3/1999 | Furlan et al. ........... 416/213 R |
| 6,077,002 | A | * | 6/2000 | Lowe ........................ 409/132 |
| 6,185,818 | B1 | * | 2/2001 | Ito et al. .................... 29/889.7 |
| 6,219,916 | B1 | * | 4/2001 | Walker et al. ........... 29/889.21 |
| 6,521,059 | B1 | * | 2/2003 | Nazmy et al. .............. 148/421 |
| 6,536,110 | B1 | * | 3/2003 | Smith et al. ............. 29/889.21 |
| 6,905,312 | B1 | * | 6/2005 | Bourgy et al. ............. 416/234 |
| 2003/0163212 | A1 | * | 8/2003 | Smith et al. .................. 700/95 |

FOREIGN PATENT DOCUMENTS

| GB | 1 344 520 | 1/1974 |
| JP | 59001125 A | * | 1/1984 |

* cited by examiner

*Primary Examiner*—Daniel W. Howell
*Assistant Examiner*—Sara Addisu
(74) *Attorney, Agent, or Firm*—Oliff & Berridge, PLC

(57) ABSTRACT

A disc component for a gas turbine engine is produced from a workpiece by a sequence of machining operations. During the machining operations, the workpiece is supported by a fixture engaging support surfaces. The workpiece remains secured to the fixture throughout the sequence of machining operations so that these operations can be conducted on both faces of a disc portion of the workpiece without removing the workpiece from the fixture. The machining operations are conducted alternately on the opposite faces in order to allow residual stresses in the workpiece to dissipate in a controlled manner.

13 Claims, 2 Drawing Sheets

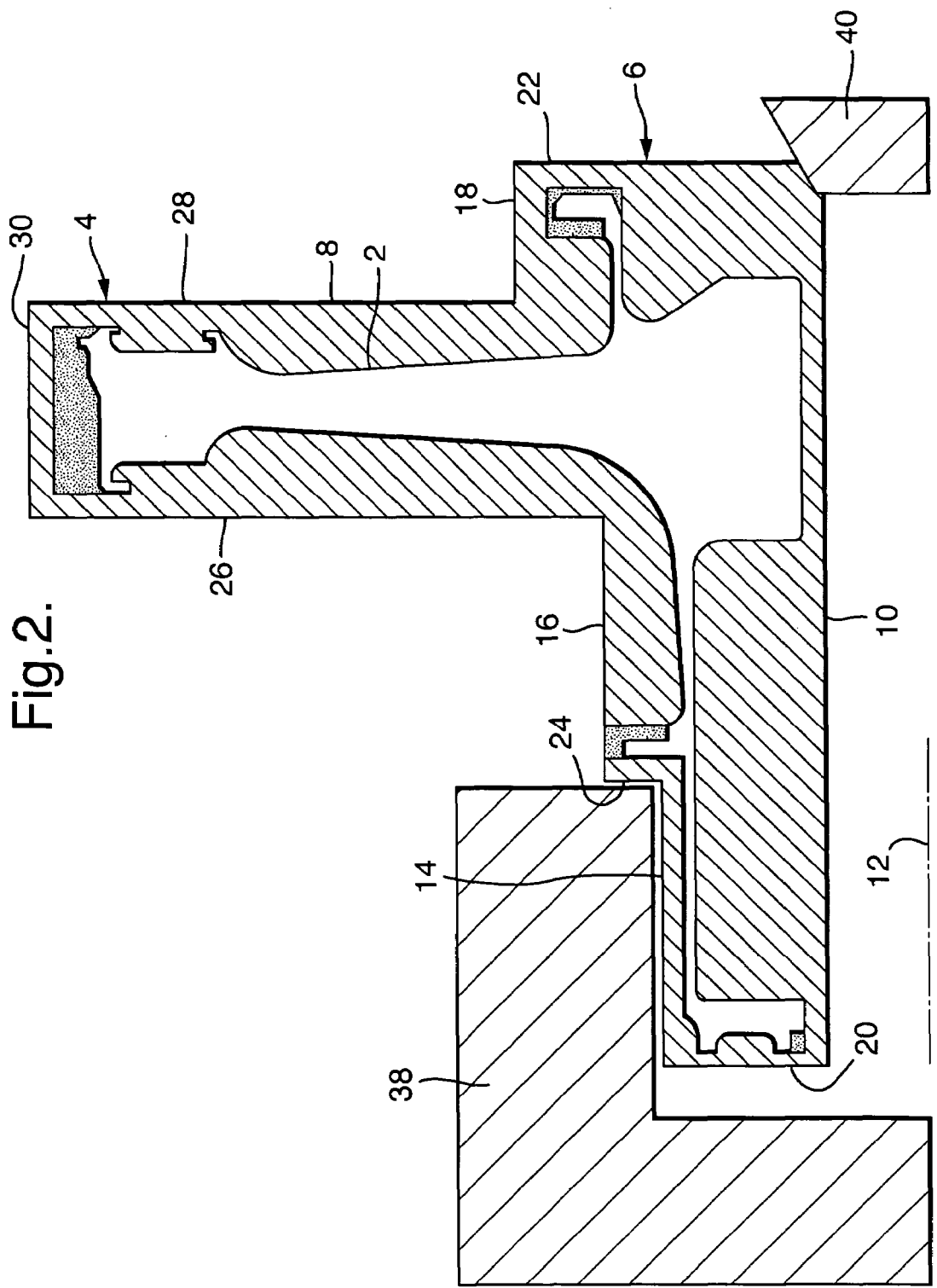

PRODUCTION OF DISC COMPONENTS

This invention relates to a method of producing, from a workpiece, a finished disc component for a gas turbine engine. The invention is particularly, although not exclusively, concerned with the production of turbine disc components, but may be applied also to other components such as compressor discs and coverplates.

Discs for gas turbine engines are highly critical parts that are severely loaded during operation. It is known to produce such discs from forgings, castings, or powdered metal forms, which are initially machined to create a starting workpiece of rectilinear shape suitable for ultrasonic inspection to detect flaws. After this inspection, the starting workpiece is machined to the final shape.

Residual stresses exist in the starting workpiece as a result of the manufacturing process. Consequently, as material is removed during the machining process, these stresses cause distortion which must be eliminated in subsequent machining operations so that the finished disc is free of distortion.

To achieve this in a current technique, the starting workpiece is clamped at its periphery and successive machining operations are conducted alternately on one face of the disc and on the other, and so on until all machining operations are completed. As presently conducted, the process requires the workpiece to be moved from one fixture to another between machining operations in order to expose the face to be machined at each step. This creates additional distortions as the periphery of the disc is successively constrained by and released from different fixtures. In addition, there are changes in the datum faces which locate the workpiece in the machining centre, and the workpiece has to be set up again in the machine tool with each change of fixture. These factors result in a loss of accuracy.

The current methods require up to sixteen turning operations, and the need to move the workpiece from one fixture to another between each operation means that the entire machining process is very lengthy, prone to errors, provides many opportunities for the workpiece to be damaged. By way of example, the machining of a turbine disc by current methods can require nineteen hours for rough machining followed by sixteen hours of finish machining.

According to the present invention there is provided a method of producing, from a workpiece, a finished disc component for a gas turbine engine, the workpiece having a hub portion and a disc portion extending radially outwardly from the hub portion, the method including:

forming a support surface on the hub portion;

supporting the workpiece in a machine tool by means of the support surface in a manner which provides tool access to both axial faces of the disc portion; and performing a sequence of machining operations alternately on opposite sides of the disc portion while maintaining the support of the workpiece by means of the support surface.

The support surface is preferably cylindrical and centred on the longitudinal axis of the workpiece. The support surface may be either an internal or an external support surface for locating engagement with a suitable fixture.

The fixture may be mounted for rotation in a machine tool such as a lathe. The fixture may be secured to the workpiece substantially at one axial end of the hub, and the opposite axial end of the hub may be supported by a tailstock of the machine tool. The support surface may be a cylindrical bore extending completely through the hub portion, in which case the fixture and the tailstock may engage opposite axial ends of the bore. Alternatively, a second support surface may be formed on the hub portion so that the fixture and the tail stock engage different support surfaces.

The outer periphery of the disc portion is preferably unconstrained during all or most of the sequence of machining operations. In other words, the workpiece is supported solely at the hub portion, either by a fixture alone or by the fixture and a tailstock.

When material is removed from the workpiece, the resulting distortion can take time to develop fully. Consequently, during the sequence of machining operations, strain relieving periods of predetermined duration may be left between successive operations. This is to allow distortion to take place following a preceding machining operation on one face of the disc portion before a succeeding operation is carried out on the opposite face of the disc portion.

In order to eliminate distortion in the finished disc component, it is preferable for all rough and/or semi-finish machining operations on the disc portion to be completed on both faces of the disc portion before any finishing operations are conducted on the disc portion. In particular, machining operations in which relatively large quantities of material are removed are preferably carried out early in the sequence of operations. Also, it is preferable for regions of the disc portion having high residual stress (by comparison with other regions of the disc portion) to be removed before regions having lower residual stress. These measures ensure that maximum distortion of the disc occurs at early stages in the sequence of machining operations, while there is still plenty of material on the workpiece which is subsequently removed to compensate for the distortions which occur.

The present invention also provides a disc component formed by a method as defined above, and a disc assembly incorporating the component.

For a better understanding of the present invention, and to show more clearly how it may be carried into effect, reference will now be made, by way of example, to the accompanying drawings, in which:

FIG. 2 represents a similar workpiece supported by an alternative fixture.

Figure 1:
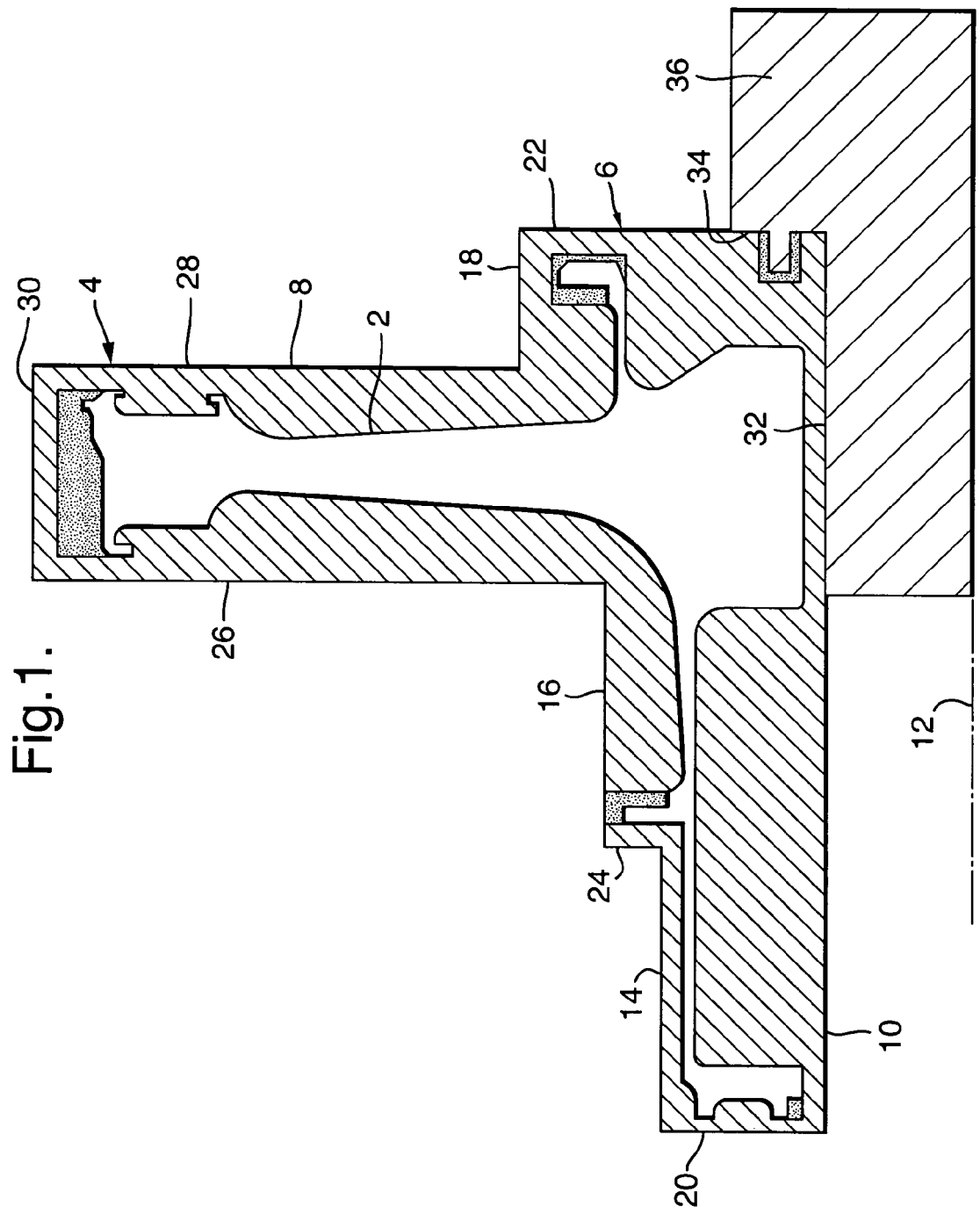
FIG. 1 represents a workpiece supported by a fixture.

FIG. 1 shows the outline of a turbine disc 2 disposed within the outline of a starting workpiece 4. The starting workpiece 4 is machined from a raw forging and comprises a hub portion 6 and a disc portion 8. The hub portion 6 has a central cylindrical bore 10 which is centred on the longitudinal axis 12 of the workpiece.

It will be appreciated that the starting workpiece 4 is of relatively simple structure. The central bore 10 is of constant diameter throughout and the outer surface of the hub portion 6 comprises three cylindrical surfaces 14, 16 and 18. The hub portion 6 has radially extending axial end faces 20 and 22, and a third radially extending surface 24 connects the cylindrical surfaces 14 and 16. The disc portion 8 comprises radially extending axial end faces 26 and 28, and a cylindrical peripheral surface 30.

The relatively simple shape of the starting workpiece 4 makes it suitable for inspection, for example ultrasonic inspection, to establish whether or not any flaws exist in the raw forging which will affect the integrity of the finished disc 2. If the starting workpiece 4 passes these tests it is prepared for further machining.

For this machining, the workpiece 4 needs to be supported reliably. During the forging process, stresses are created in the raw forging, and most of these residual stresses remain in the starting workpiece 4. As material is removed to form the finished disc 2, these residual stresses will be released, resulting in distortion of the workpiece as machining proceeds. For reliable support of the workpiece 4 during the machining operation, it is desirable for the workpiece 4 to be supported at a region of high stiffness and low residual distortion in order to minimise movement of the support surface as machining proceeds.

In the starting workpiece 4 of FIG. 1, this area of high stiffness and low distortion is at the radially inner region of the hub, generally in radial alignment with the disc portion 8. Thus, the region of the inner bore 10 towards the right-hand end of the workpiece 4, as seen in FIG. 1, is used as a radial support surface 32, while the radially inner region of the end surface 22 serves as an axial support surface 34. A fixture 36 engages the support surfaces 32 and 34, and is rigidly secured to the starting workpiece 4. It will be appreciated that, with the starting workpiece 4 supported on the fixture 36, most of the external surface of the workpiece 4 is accessible by cutting and finishing tools. In particular, both faces 26 and 28 of the disc portion 8 are accessible without needing to remove the workpiece 4 from the fixture 36.

The disc portion of the finished disc 2 is created by a carefully controlled sequence of machining operations on the disc portion 8. Each metal removal step releases residual stress in the workpiece 4, resulting in distortion. Consequently, machining operations are performed alternately on opposite sides of the faces 26 and 28 so that distortion arising from any individual machining operation is compensated for by subsequent machining operations.

It is desirable for early machining operations in the sequence to remove material at regions of higher residual stress. This will cause maximum distortion of the disc portion 8 but, at that stage, there is plenty of material left to enable this distortion to be compensated for by the removal of further material in subsequent machining operations.

It is also desirable for the sequence of machining operations to be programmed so that the stiffness of the workpiece at any stage is sufficient to withstand the machining forces applied to it.

In practice, all rough machining and semifinish machine should be completed before finish machining operations are performed.

Since the release of residual stress on removal of material does not occur immediately, it is desirable for some machining operations to be deferred for a predetermined time following the immediately preceding machining operation, so that the full distortion arising from the immediately preceding operation has taken place before the next successive operation begins.

During the machining operations on the faces 26 and 28 of the disc portion 8, the workpiece 4 remains secured to the fixture 36. Furthermore, many of the machining operations on the hub portion 6 can be accomplished while the workpiece 4 is on the fixture 36. This saves the time which might otherwise be taken in removing the workpiece 4 from one fixture and securing it to a second fixture between machining operations. Also, all of the machining operations, at least on the disc portion 8, can be accomplished by reference to only a single datum, whereas a change of fixture would require the setting of a new datum.

The use of the fixture 36 supporting the hub of the workpiece 4 enables the machining process to be extensively automated, particularly if the machining operations are carried out on a CNC lathe with tool changing capability. The ready access to both faces 26 and 28 of the disc portion 8 enables rapid changeover from a machining operation on one face to a machining operation on the opposite face, where no delay is required to enable distortion to take effect.

The use of a single fixture 36 and the resulting increase in cycle time between machining operations reduces manual handling of the workpiece 4, work in progress, floor space required and the number of fixtures 36 needed for each disc design. Preliminary indications are that the time taken to produce a finished disc 2 from a forging can be reduced from approximately 35 hours using current techniques to less than 6½ hours using a procedure as described above.

FIG. 2 shows an alternative supporting arrangement for the starting workpiece 4. In FIG. 2, the workpiece 4 and the finished disc 2 are substantially identical to those shown in FIG. 1, and their features are referred to by the same reference numerals.

In FIG. 2, the workpiece 4 is supported at the cylindrical surface 14 by a fixture 38, with additional support being provided by an automatic tailstock 40. As with the arrangement of FIG. 1, the fixture 38 is rigidly secured to the workpiece 4 and is mounted for rotation in a lathe.

The invention claimed is:

1. A method of producing, from a workpiece, a finished disc for a gas turbine engine, the workpiece having a hub and a disc extending radially outwardly from the hub, the method including:
   forming a support surface on the hub;
   supporting the workpiece in a machine tool by means of the support surface in a manner which provides tool access to both axial faces of the disc; and
   performing a sequence of machining operations alternately on opposite sides of the disc while maintaining support of the workpiece by the support surface,
   wherein the machining operations are turning operations conducted on a lathe.

2. The method as claimed in claim 1, wherein the finished disc is produced from a forged workpiece.

3. The method as claimed in claim 1, wherein the support surface is cylindrical and aligned with a longitudinal axis of the workpiece.

4. The method as claimed in claim 1, wherein the support surface is an internal surface of the hub.

5. The method as claimed in claim 1, wherein the support surface is an external surface of the hub.

6. The method as claimed in claim 1, wherein the workpiece is supported by a fixture which engages the support surface and is non-rotatably secured to the workpiece.

7. The method as claimed in claim 6, wherein, in addition to the fixture, a tailstock engages the workpiece at a position spaced from the fixture.

8. The method as claimed in claim 1, in which the outer periphery of the disc is unconstrained during at least some of the machining operations.

9. The method as claimed in claim 1, wherein regions of the workpiece in which there is high residual stress are removed in machining operations occurring early in the sequence of machining operations.

10. A method of producing a disc assembly, comprising:
    producing a finished disc according to the method of claim 1; and
    including the finished disc in a disc assembly.

11. A method of producing a gas turbine engine, comprising:
    producing a finished disc according to the method of claim 1; and
    including the finished disc in a gas turbine engine.

12. A method of producing, from a workpiece, a finished disc for a gas turbine engine, the workpiece having a hub and a disc extending radially outwardly from the hub, the method including:

forming a support surface on the hub;

supporting the workpiece in a machine tool by means of the support surface in a manner which provides tool access to both axial faces of the disc; and performing a sequence of machining operations alternately on opposite sides of the disc while maintaining support of the workpiece by the support surface, wherein at least one of the machining operations is delayed after completion of the immediately preceding machining operation, until distortion resulting from the immediately preceding machining operation has taken effect.

13. A method of producing, from a workpiece, a finished disc for a gas turbine engine, the workpiece having a hub and a disc extending radially outwardly from the hub, the method including:

forming a support surface on the hub;

supporting the workpiece in a machine tool by means of the support surface in a manner which provides tool access to both axial faces of the disc; and performing a sequence of machining operations alternately on opposite sides of the disc while maintaining support of the workpiece by the support surface, wherein finish machining operations on the disc take place after all rough and semifinish machining operations on both axial faces of the disc have been completed.

* * * * *